Patented July 28, 1936

2,049,294

UNITED STATES PATENT OFFICE 2,049,294

PREPARATION OF OIL-SOLUBLE MERCURY COMPOUNDS

Albert L. Flenner, Wilmington, Del., assignor to E. I. du Pont de Nemours & Company, Wilmington, Del., a corporation of Delaware No Drawing. Application November 23, 1934, Serial No. 754,409

9 Claims. (Cl. 167—43)

This invention relates to the preparation of oil soluble mercury compounds of the aromatic series particularly those compounds the acetates of which can be prepared by direct mercurization.

An object of the present invention is to provide a new and improved method of preparing oil soluble mercury compounds of the aromatic series. A further object is to provide a new and improved method of producing homogeneous solutions of mercury compounds of the aromatic series in a hydrocarbon oil. Other objects are to advance the art. Still other objects will appear hereinafter.

These objects may be accomplished in accordance with my invention which comprises reacting an aromatic mercury acetate with a higher fatty acid derivable from a saponifiable fat or oil. The aromatic mercury acetate, having the formula $$R-Hg-Ac$$

wherein R represents an aromatic nucleus and Ac represents an acetic acid radical, is suspended in a paraffin oil or other hydrocarbon oil whose boiling point is higher than that of acetic acid and in which the final product of the reaction is soluble. Then one equivalent of a fatty acid derivable from a saponifiable fat is added. The temperature is then raised to 120° C. or higher but below the boiling point of the oil. Under these circumstances, the acetic acid will be liberated and a homogeneous oil solution of the mercury compound will be obtained. This method of preparation is of particular advantage where these compounds are to be used directly in the oil solution or as emulsions prepared from the oil solutions of the compounds as it is not necessary to isolate the compounds as is necessary when they are prepared by other methods.

The aromatic mercury acetates, to be used in my process, may be readily prepared by treating an aromatic compound, such as benzene, toluene, xylene, naphthalene and the like, in acetic acid solution, with mercuric acetate at a temperature of about 110° C., whereupon the aromatic mercury acetate will be formed.

Among the aromatic mercury acetates which may be employed in my process are phenyl mercury acetate, parachlorphenyl mercury acetate, tolyl mercury acetate, phenetyl mercury acetate and naphthyl mercury acetate. These compounds produce particularly valuable products.

Among the fatty acids, which may be employed in my process to produce the corresponding aromatic mercury salts, oleic acid, stearic acid and palmitic acid produce particularly valuble compounds.

In order to more clearly illustrate my invention and the preferred modes of carrying the same into effect, the following examples are given:

Example 1

50 parts of phenyl mercury acetate were suspended in 345 parts of paraffin oil having a Saybolt reading of 110 sec. at 100° F. 42 parts of oleic acid were added. The temperature was then raised to 130° C. and held there until all of the acetic acid had distilled off. A 20% solution of phenyl mercury oleate in paraffin oil was obtained.

Example 2

50 parts of phenyl mercury acetate were suspended in 345 parts of cocoanut oil. 42 parts of oleic acid were added and the temperature raised to 130° C. and maintained until all of the acetic acid had distilled off. This resulted in a 20% solution of phenyl mercury oleate in the oil.

Example 3

50 parts of tolyl mercury acetate were treated with 41 parts of oleic acid in 345 parts of oil at 130° C. After all of the acetic acid had distilled off, a 20% solution of tolyl mercury oleate in oil remained.

Example 4

50 parts of para-chloro-phenyl mercury acetate were treated with 39.5 parts of oleic acid in 344 parts of oil under the conditions of Example 1. This produced a solution of para-chloro-phenyl mercury oleate in the oil.

Example 5

50 parts of beta-naphthol 1-mercuric acetate in 305 parts of paraffin oil were treated with 35.3 parts of oleic acid and heated to distill off the acetic acid. This resulted in a homogeneous solution of beta-naphthol mercury oleate in the oil.

In Example 5, beta-naphthol 5-mercuric acetate may be employed in place of the 1-mercuric acetate and the corresponding fatty acid salt obtained.

The above examples are merely illustrative of my invention. The oleic acid employed in such examples may be replaced by stearic acid, palmitic acid or any of the other fatty acids derivable from saponifiable fats, among which may be mentioned erucic acid, linoleic acid, ricinoleic acid, elaeomargaric acid, elaeosteric acid, lauric acid and sebacic acid, to form the corresponding salts, such as phenyl mercury palmitate and the like.

It will be readily apparent that I have provided a new and improved method for preparing oil soluble mercury compounds of the aromatic series and particularly for preparing oil solutions thereof. This method of preparing such oil solutions is cheap and much easier to operate than methods heretofore known for producing compounds of this type. These oil solutions and emulsions are useful as fungicides and as preserving agents for wood, fabrics, cordage for fish nets, and the like.

While I have disclosed the preferred embodiments of my invention and the preferred methods of carrying the same into effect, it will be readily apparent to those skilled in the art that many variations and modifications may be made therein without departing from the spirit thereof. Accordingly, the scope of my invention is to be limited solely by the appended claims construed as broadly as is permissible in view of the prior art.

I claim:

1. The method of preparing an oil solution of an aromatic mercury salt which comprises incorporating, in a hydrocarbon oil having a boiling point above 120° C., a compound of the type R—Hg—Ac wherein R represents an aromatic nucleus and Ac represents an acetic acid radical, adding one equivalent of a fatty acid derivable from a saponifiable fat, heating the mixture to a temperature sufficient to distill off acetic acid but insufficient to distill off or decompose the oil or the fatty acid, and maintaining such temperature until the liberated acetic acid is distilled off.

2. The method of preparing an oil solution of an aromatic mercury salt which comprises incorporating, in a hydrocarbon oil having a boiling point above 120° C., a compound of the type R—Hg—Ac wherein R represents an aromatic nucleus of the benzene and naphthalene series and Ac represents an acetic acid radical, adding one equivalent of a fatty acid derivable from a saponifiable fat, heating the mixture to a temperature sufficient to distill off acetic acid but insufficient to distill off or decompose the oil or the fatty acid, and maintaining such temperature until the liberated acetic acid is distilled off.

3. The method of preparing an oil solution of an aromatic mercury salt which comprises incorporating, in a hydrocarbon oil having a boiling point above 120° C., a compound of the type R—Hg—Ac wherein R represents a phenyl nucleus and Ac represents an acetic acid radical, adding one equivalent of a fatty acid derivable from a saponifiable fat, heating the mixture to a temperature sufficient to distill off acetic acid but insufficient to distill off or decompose the oil or the fatty acid, and maintaining such temperature until the liberated acetic acid is distilled off.

4. The method of preparing an oil solution of an aromatic mercury salt which comprises incorporating, in a hydrocarbon oil having a boiling point above 120° C., a compound of the type R—Hg—Ac wherein R represents an aromatic nucleus and Ac represents an acetic acid radical, adding one equivalent of oleic acid, heating the mixture to a temperature sufficient to distill off acetic acid but insufficient to distill off or decompose the oil or the oleic acid, and maintaining such temperature until the liberated acetic acid is distilled off.

5. The method of preparing an oil solution of an aromatic mercury salt which comprises incorporating, in a hydrocarbon oil having a boiling point above 120° C., a compound of the type R—Hg—Ac wherein R represents an aromatic nucleus of the benzene and naphthalene series and Ac represents an acetic acid radical, adding one equivalent of oleic acid, heating the mixture to a temperature sufficient to distill off acetic acid but insufficient to distill off or decompose the oil or the oleic acid, and maintaining such temperature until the liberated acetic acid is distilled off.

6. The method of preparing an oil solution of an aromatic mercury salt which comprises incorporating, in a hydrocarbon oil having a boiling point above 120° C., a compound of the type R—Hg—Ac wherein R represents a phenyl nucleus and Ac represents an acetic acid radical, adding one equivalent of oleic acid, heating the mixture to a temperature sufficient to distill off acetic acid but insufficient to distill off or decompose the oil or the oleic acid, and maintaining such temperature until the liberated acetic acid is distilled off.

7. The method of preparing an oil solution of phenyl mercury oleate which comprises incorporating, in a hydrocarbon oil having a boiling point above 120° C., phenyl mercury acetate, adding one equivalent of oleic acid, heating the mixture to a temperature sufficient to distill off acetic acid but insufficient to distill off or decompose the oil or the oleic acid, and maintaining such temperature until the liberated acetic acid is distilled off.

8. The method of preparing an oil solution of tolyl mercury oleate which comprises incorporating, in a hydrocarbon oil having a boiling point above 120° C., tolyl mercury acetate, adding one equivalent of oleic acid, heating the mixture to a temperature sufficient to distill off acetic acid but insufficient to distill off or decompose the oil or the oleic acid, and maintaining such temperature until the liberated acetic acid is distilled off.

9. The method of preparing an oil solution of beta-naphthol mercury oleate which comprises incorporating, in a hydrocarbon oil having a boiling point above 120° C., beta-naphthol 1-mercuric acetate, adding one equivalent of oleic acid, heating the mixture to a temperature sufficient to distill off acetic acid but insufficient to distill off or decompose the oil or the oleic acid, and maintaining such temperature until the liberated acetic acid is distilled off.

ALBERT L. FLENNER.